United States Patent
Mitchell et al.

(10) Patent No.: US 7,535,575 B2
(45) Date of Patent: May 19, 2009

(54) PLASMA SHUNTING APPARATUS AND METHOD FOR RING LASER GYROSCOPE

(75) Inventors: Robert Mitchell, Woodland Hills, CA (US); Shane Sammon, Reseda, CA (US); Carl Bathelt, Jr., Simi Valley, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 212 days.

(21) Appl. No.: 11/810,443

(22) Filed: Jun. 5, 2007

(65) Prior Publication Data

US 2008/0304052 A1 Dec. 11, 2008

(51) Int. Cl.
G01C 19/64 (2006.01)
G01C 19/66 (2006.01)

(52) U.S. Cl. .................. 356/459; 356/469
(58) Field of Classification Search .......... 356/459, 356/469, 470
See application file for complete search history.

(56) References Cited

U.S. PATENT DOCUMENTS

| | | | | |
|---|---|---|---|---|
| 4,481,635 A | * | 11/1984 | Broberg et al. | 356/459 |
| 5,786,895 A | * | 7/1998 | Mitchell et al. | 356/467 |
| 5,818,591 A | * | 10/1998 | Albers et al. | 356/469 |
| 6,259,528 B1 | * | 7/2001 | Albers et al. | 356/459 |
| 7,280,218 B2 | * | 10/2007 | Mitchell et al. | 356/459 |
| 2006/0146335 A1 | * | 7/2006 | Mitchell et al. | 356/459 |

* cited by examiner

Primary Examiner—Patrick J Connolly
(74) Attorney, Agent, or Firm—Lynn & Lynn

(57) ABSTRACT

A ring laser gyroscope includes a first plasma shunt arranged to prevent the plasma from contacting a first mirror in the gain region and a second plasma shunt arranged to prevent the plasma from contacting a second mirror in the gain region. The first and second plasma shunts may comprise electrical conductors located in the respective mirror wells and arranged such that contact between the plasma and the electrical conductors quenches the plasma in the mirror wells and produces electrical currents that travels across the mirror wells. The electrical conductors may be formed as metallized strips arranged to extend across the mirror wells, or they may be formed from metal wires. The plasma shunts may alternatively comprise diversion passages formed in the frame and arranged such that the plasma fills the diversion passages and bypasses the mirrors.

10 Claims, 3 Drawing Sheets

PLASMA SHUNTING APPARATUS AND METHOD FOR RING LASER GYROSCOPE

BACKGROUND OF THE INVENTION

This invention relates generally to ring lasers and particularly to ring laser gyroscope rotation sensors. Still more particularly, this invention relates to apparatus and methods for preventing plasma in the lasing medium of a ring laser gyroscope from impinging on mirrors used to direct the laser beam in a closed path.

Ring laser gyroscopes have been used in navigation systems for several years. A plurality of mirrors directs counter-propagating laser beams through a closed optical path defined by a plurality of passages or bores in a frame that is typically formed of a thermally stable glass/ceramic material. The laser beam is formed by applying a suitable voltage to a gain medium such as a mixture of Helium and Neon to produce a plasma. Electrons in the plasma emit light as they transition from a high energy state to a lower energy state. The optical path is formed to have a selected length so that a selected frequency of light produced in the gain medium resonates and is amplified.

To obtain the maximum optical signal it is necessary that the mirrors be as free of surface contaminants that degrade the reflectivity of the mirrors. Mirror contamination is a major factor in reducing the length of time for which a ring laser is considered to be useful in navigation system applications. As the ring laser operates, a small amount of the frame material becomes devitrified and mixes with the plasma. Some of the devitrified frame material is deposited on the mirror surfaces that are exposed to the plasma. This devitrified frame material slowly degrades the mirrors and reduces the laser intensity in the cavity.

The prior art solution to the problem of reducing ring laser mirror contamination is the use of various shielding techniques. Mirror shielding can be effective, but presently known mirror shields are costly to fabricate and install.

SUMMARY OF THE INVENTION

The present invention provides an inexpensive, easy to install plasma shunt that reduces exposure of ring laser mirrors to contaminants carried by the laser gain medium.

A ring laser gyroscope according to the present invention includes a frame, a cavity in the frame, a first anode, a second anode and a cathode arranged to define a gain region in the cavity and to form a plasma extending between the first and second anodes in a gain medium within the gain region, a first mirror well formed in the frame between the first anode and the cathode, a first mirror mounted to the frame adjacent the first mirror well, a second mirror well formed in the frame between the second anode and the cathode, a second mirror mounted to the frame adjacent the second mirror well, the first and second mirror wells being arranged to intersect the cavity. A first plasma shunt is located in the first mirror well and arranged to prevent the plasma from contacting the first mirror, and a second plasma shunt is located in the second mirror well and arranged to prevent the plasma from contacting the second mirror.

Each of the first and second plasma shunts may comprise an electrical conductor located in the respective mirror wells and arranged such that contact between the plasma and the electrical conductors quenches the plasma in the mirror wells and produces electrical currents that travels across the mirror wells.

The first and second electrical conductors may be formed as first and second metallized strips arranged to extend across the first and second mirror wells, respectively and are spaced apart from the first and second mirrors. The electrical conductors may also be formed from metal wires.

The first plasma shunt may alternatively comprise a first diversion passage formed in the frame and arranged to extend through the first mirror well and to intersect the cavity at two locations near the first mirror well that are spaced apart from the first mirror and arranged such that the plasma fills the first diversion passage in the first mirror well without contacting the first mirror. The second plasma shunt may be formed as a second diversion passage to divert the plasma away from the second mirror.

DETAILED DESCRIPTION OF THE INVENTION

Figure 1:
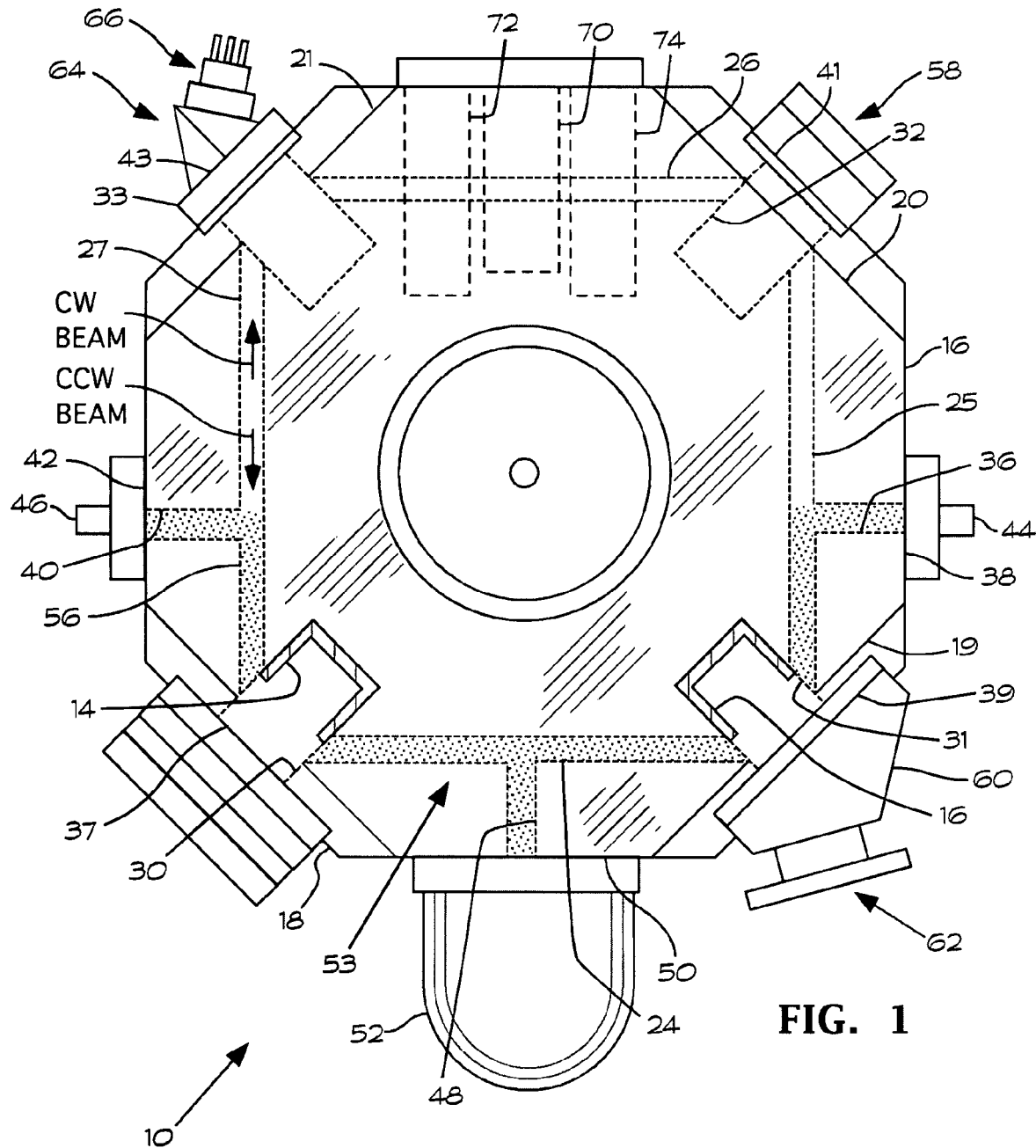
FIG. 1 is a top plan view of a ring laser that includes a first plasma shunt device according to the present invention.

FIG. 1 illustrates basic structural features of a zero lock ring laser gyroscope 10 that includes plasma shunts 12 and 14 according to the present invention. The basic features are of such ring laser gyroscopes are well-known and therefore are explained only briefly herein to facilitate an understanding and appreciation of the present invention.

The ring laser gyroscope includes a frame 16 that preferably is formed of a glass-ceramic composite material that has a very low coefficient of thermal expansion. The frame 16 includes four exterior planar surfaces 18-21. Circular bores 24-27 formed in the frame 16 between adjacent pairs of the mirrors 18-21 form a continuous cavity 28. In the embodiment shown in FIG. 1 mirror wells 30-33 are formed in the frame 16 at the planar surfaces 18-21, respectively. Mirrors 37, 39, 41 and 43 are mounted to the frame 16 over the outer ends of the mirror wells 30, 31, 32 and 33, respectively.

A first anode bore 36 formed in the frame 16 extends from the bore 25 to a surface 38 of the frame 16. A second anode bore 40 formed in the frame 16 extends from the bore 27 to a anode face 42 of the frame 16. Anodes 44 and 46 are mounted to the frame 16 and are arranged to seal the anode bores 25 and 27, respectively from fluid communication outside the frame 16. A cathode bore 48 formed in the frame 16 extends from the bore 24 to an anode face 50 of the frame 16. A cathode 52 is mounted to the frame 16 and arranged to seal the cathode bore 48 against fluid communication outside the frame 16.

During assembly of the ring laser gyroscope 10, the bores 24-27, 36, 40 and 48 are filled with a lasing medium, which is typically a He—Ne gas mixture. An RF electrical signal from an RF signal source (not shown) is applied to the anodes 44 and 46 and to the cathode 52. The RF electrical signal causes the lasing medium to become as plasma that emits light in the region between the anode 44 and the cathode 52 and between the anode 46 and the cathode 52. Although the light that forms the laser beam is emitted only a gain region 53 that includes the bore 24 and the shaded regions 54 and 56 of the bores 25 and 27, respectively, the light is formed into two beams that propagate in the clockwise (CW) and counterclockwise (CCW) directions around the cavity 28 in the frame 16.

A pathlength control assembly 58 adjusts the position of the mirror 41 so that the pathlength around the cavity 28 is appropriate to create the resonance that is necessary for lasing to occur in the cavity 28.

The mirror 39 is partially transmissive so that a small portion of the laser light is emitted from the cavity 27. The emitted light propagates through a prism 60 mounted to the back of the mirror 39 and impinges upon a photodetector assembly 62. The photodetector assembly 62 forms an electrical signal that indicates the intensity of the laser beam in the cavity. This electrical signal is input to the pathlength control assembly 58, which adjusts the position of the mirror 41 to maximize the laser beam intensity.

The mirror 43 is also partially transmissive so that portions of both the CW and CCW beams exit the cavity 27 and combine in a combining optics assembly 64. The combined beams interfere in a manner well-known in classical optics. A photodetector assembly 66 produces an electrical signal that indicates the intensity of the light in the resulting interference pattern, which is processed to determine the rotation rate of the frame about a sensing axis that is fixed relative to the frame 16.

The ring laser gyroscope 10 further includes a magnet 70 and a pair of Faraday rotator assemblies 72 and 74 are mounted to the frame between the mirrors 20 and 21.

A dispersion equalization coil 76 may be mounted to the frame 16 adjacent the mirror 37.

As explained previously, the plasma in a standard ring laser gyroscope contacts the mirrors 37 and 39 that are in the lasing region. Prolonged exposure of the mirrors 37 and 39 to the plasma degrades their reflectivity and causes a decrease in the laser beam intensity. Eventually, degradation of the mirrors 37 and 39 can cause the ring laser gyroscope to fail to function as a rotation sensor. As used herein the term "plasma shunt" should be understood to be any means for preventing the plasma in the ring laser from contacting the mirrors 37 and 39 that are in the gain region 53.

Figure 2:
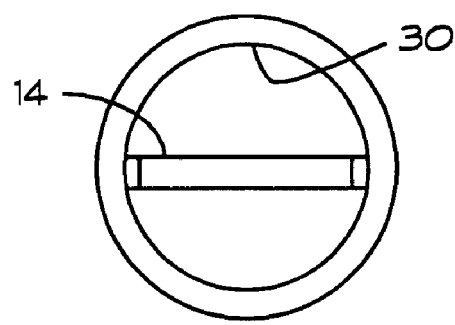
FIG. 2 is a front elevation view of a ring laser mirror well that includes a plasma shunt according to the present invention.

The plasma shunts 14 and 16 preferably have identical structures. Therefore, only the plasma shunt 14 is described in detail herein. Referring to FIGS. 1 and 2, the plasma shunt 14 may be formed as a electrically conductive strip of a material such as titanium. A metallized strip of titanium may be formed in the mirror well 30 by sputtering. The plasma shunt may also be formed from a strip of a material such as indium or form an indium wire. Upon encountering the conductive plasma shunt, the electrical discharge in the plasma in the mirror well 30 is quenched and becomes an electric current. In like manner the plasma shunt 16 quenches the plasma in the mirror well 31. The plasma shunts 14 and 16 do not interfere with the emission of light in portions of the gain region 53 that are outside the mirror.

Figure 3:
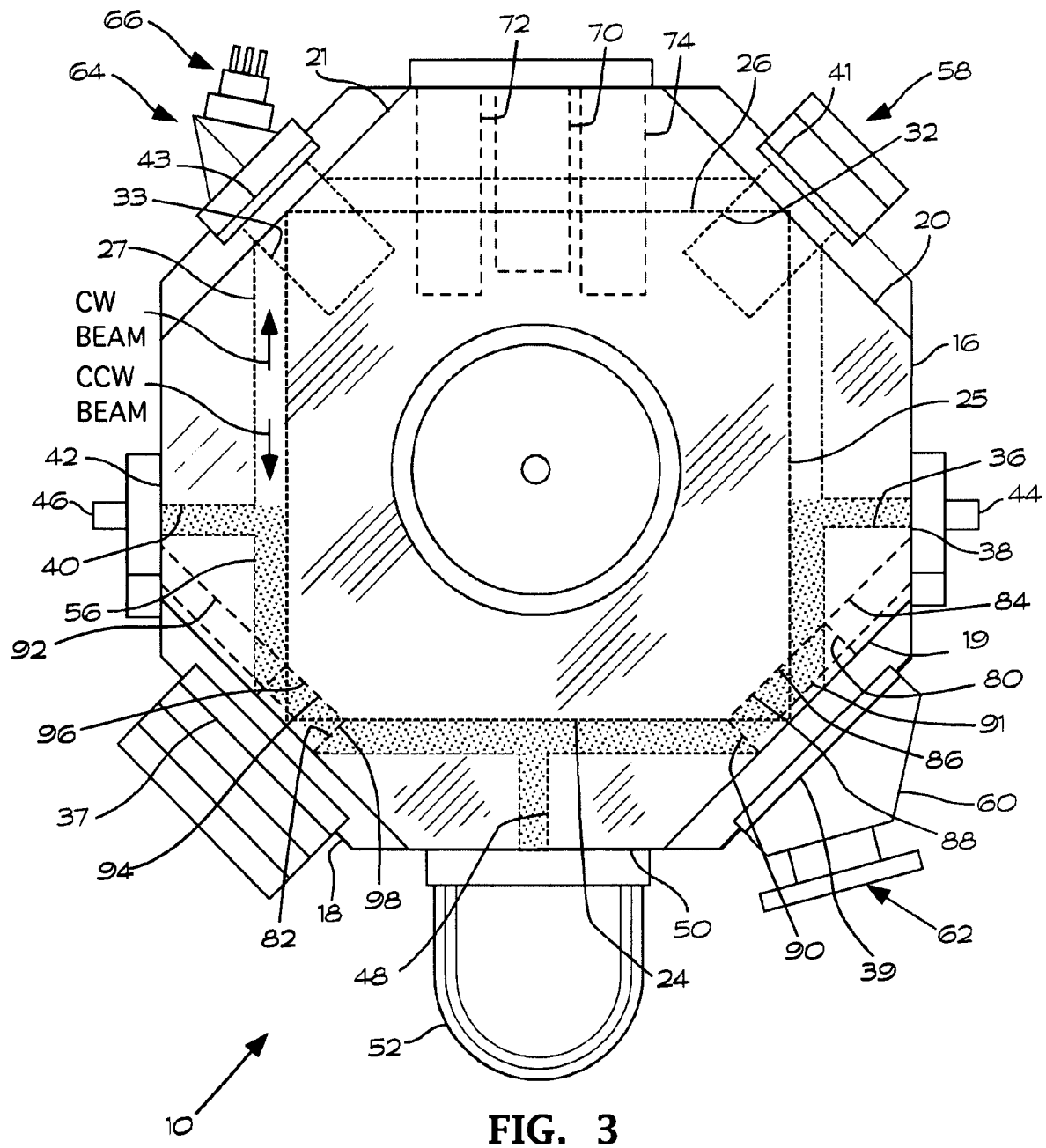
FIG. 3 is a top plan view of a ring laser that includes a second plasma shunt device according to the present invention.

FIG. 3 shows a ring laser gyroscope 78 that includes an alternative embodiment of a plasma shunt according to the present invention. The ring laser gyroscope 78 includes mirror wells 80 and 82 that are reduced in depth from the mirror wells 37 and 39 of the ring laser gyroscope 10. A first diversion passage 84 is bored into the frame 16 from the first anode face 38. The diversion passage 84 preferably extends into the mirror well 80 such that an inner edge portion 86 of the diversion passage 84 intersects the bottom 88 of the mirror well 80. The inner end 90 of the diversion passage 84 intersects the gain bore 24. The outer edge 91 of the diversion passage 84 is spaced apart in the frame 16 from the mirror 39. A second diversion passage 92 is bored into the frame 16 from the second anode face 42. The diversion passage 92, which preferably is the mirror image of the diversion passage 84, extends into the mirror well 82 such that an inner edge portion 94 of the diversion passage 92 intersects the bottom 96 of the mirror well 82. The inner end 98 of the diversion passage 92 intersects the gain bore 24.

The laser beams propagate in straight lines in the gain bores 24, 25 and 27 to and from the mirrors 37 and 39. The arrows in the gain bores 24 and 25 indicate the paths of the clockwise and counterclockwise laser beams. The plasma is in the shorter path of least resistance through the diversion passage 84 between the gain bores 24 and 25 and the diversion passage 92 between the gain bores 24 and 27. Therefore, while being continuous in the gain region 53, the plasma does not contact either of the mirrors 37 or 39.

Figure 4:
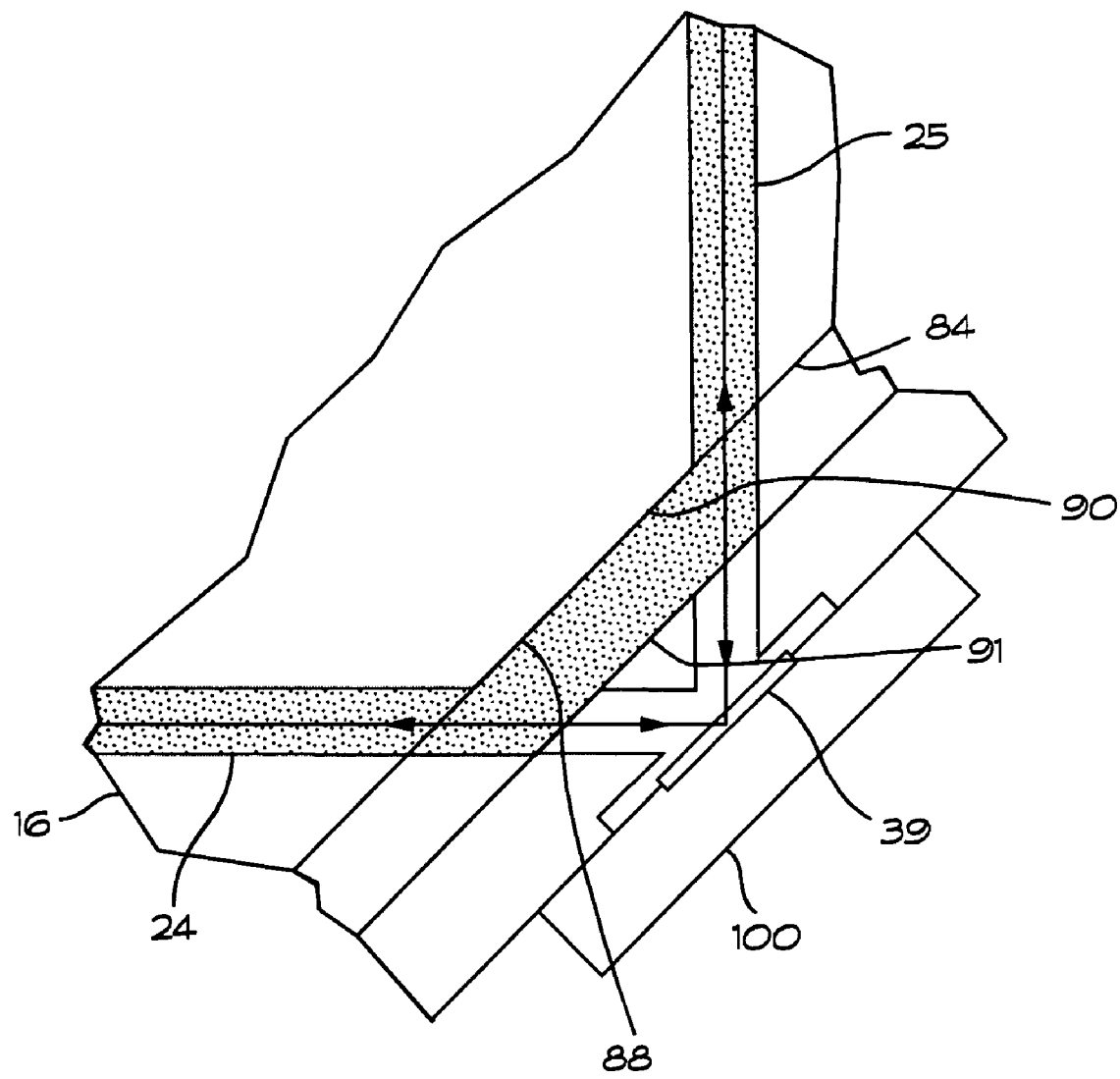
FIG. 4 is a plan view showing a portion of the plasma shunt device of FIG. 3 in greater detail.

As shown in FIG. 4, the mirror 39 typically is formed on a substrate 100 that is mounted to the frame 16. The frame 16 preferably has a recess 102 where the mirror 39 is located. Having the mirror 39 in the recess 102 protects the mirror 39 against damage that could occur if it contacted the frame 16.

The invention is illustrated and described with reference to ring laser gyroscope that includes four mirrors that direct the laser beams around the cavity 28 in a closed path. However, the basic concept of the invention is not limited to four-mirror ring lasers, and in particular, is applicable to three-mirror embodiments of ring laser gyroscopes.

What is claimed is:

1. A ring laser gyroscope that includes a frame, a cavity in the frame, a first anode, a second anode and a cathode arranged to define a gain region in the cavity and to form a plasma extending between the first and second anodes in a gain medium within the gain region, a first mirror well formed in the frame between the first anode and the cathode, a first mirror mounted to the frame adjacent the first mirror well, a second mirror well formed in the frame between the second anode and the cathode, a second mirror mounted to the frame adjacent the second mirror well, the first and second mirror wells being arranged to intersect the cavity, comprising:

a first plasma shunt located in the first mirror well and arranged to prevent the plasma from contacting the first mirror; and a second plasma shunt located in the second mirror well and arranged to prevent the plasma from contacting the second mirror.

2. The ring laser gyroscope of claim 1 wherein the first plasma shunt comprises a first electrical conductor located in the first mirror well and arranged such that contact between the plasma and the first electrical conductor quenches the plasma in the first mirror well and produces an electrical current in the first electrical conductor; and wherein the second plasma shunt comprises a second electrical conductor located in the second mirror well and arranged such that contact between the plasma and the second electrical conductor quenches the plasma in the second mirror well and produces an electrical current in the second electrical conductor.

3. The ring laser gyroscope of claim 2 wherein the first and second electrical conductors are formed as first and second metallized strips arranged to extend across the first and second mirror wells, respectively and are spaced apart from the first and second mirrors.

4. The ring laser gyroscope of claim 2 wherein the first and second electrical conductors are formed as first and second metal wires arranged to extend across the first and second mirror wells, respectively and are spaced apart from the first and second mirrors.

5. The ring laser gyroscope of claim 1 wherein the first plasma shunt comprises a first diversion passage formed in the frame and arranged to extend through the first mirror well and to intersect the cavity at two locations near the first mirror well that are spaced apart from the first mirror and arranged such that the plasma fills the first diversion passage in the first mirror well without contacting the first mirror; and wherein the second plasma shunt comprises a second diversion passage formed in the frame and arranged to extend through the second mirror well and to intersect the cavity at two locations near the second mirror well that are spaced apart from the second mirror and arranged such that the plasma fills the second diversion passage in the second mirror well without contacting the second mirror.

6. A method for preventing plasma damage to mirrors in a ring laser gyroscope gain medium, the ring laser gyroscope including a frame, a cavity in the frame, a first anode, a second anode and a cathode arranged to define a gain region in the cavity and to form a plasma extending between the first and second anodes the gain medium within the gain region, a first mirror well formed in the frame between the first anode and the cathode, a first mirror mounted to the frame adjacent the first mirror well, a second mirror well formed in the frame between the second anode and the cathode, a second mirror mounted to the frame adjacent the second mirror well, the first and second mirror wells being arranged to intersect the cavity, comprising the steps of:
- (a) placing a first plasma shunt in the first mirror well spaced apart from the first mirror and arranged to prevent the plasma from contacting the first mirror; and
- (b) placing a second plasma shunt in the second mirror well spaced apart from the second mirror and arranged to prevent the plasma from contacting the second mirror.

7. The method of claim 6 wherein step (a) comprises the steps of placing a first electrical conductor in the first mirror well and arranging the first electrical conductor such that contact between the plasma and the first electrical conductor quenches the plasma in the first mirror well and produces an electrical current in the first electrical conductor; and wherein step (b) comprises the steps of placing a second electrical conductor in the second mirror well and arranging the second electrical conductor such that contact between the plasma and the second electrical conductor quenches the plasma in the second mirror well and produces an electrical current in the second electrical conductor.

8. The method of claim 7 including the steps of forming the first and second electrical conductors as first and second metallized strips and arranging the first and second metallized strips to extend across the first and second mirror wells, respectively spaced apart from the first and second mirrors.

9. The method of claim 7 including the steps of forming the first and second electrical conductors as first and second metal wires arranging the first and second metal wires to extend across the first and second mirror wells spaced apart from the first and second mirrors.

10. The method of claim 6 wherein step (a) comprises the steps of forming a first diversion passage in the frame to extend through the first mirror well to intersect the cavity at two locations near the first mirror well that are spaced apart from the first mirror and arranging the first diversion passage such that the plasma fills the first diversion passage in the first mirror well without contacting the first mirror; and wherein step (b) comprises the steps of forming a second diversion passage in the frame to extend through the second mirror well and arranging the second diversion passage to intersect the cavity at two locations near the second mirror well that are spaced apart from the second mirror and arranged such that the plasma fills the second diversion passage in the second mirror well without contacting the second mirror.

\* \* \* \* \*